J. W. LIVINGSTON.
PNEUMATIC WHEEL.
APPLICATION FILED NOV. 7, 1908.

1,013,554.

Patented Jan. 2, 1912.

2 SHEETS—SHEET 1.

Witnesses

Inventor
J. W. Livingston,
By Woodward & Chandler
Attorneys

J. W. LIVINGSTON.
PNEUMATIC WHEEL.
APPLICATION FILED NOV. 7, 1908.
1,013,554.
Patented Jan. 2, 1912.
2 SHEETS—SHEET 2.
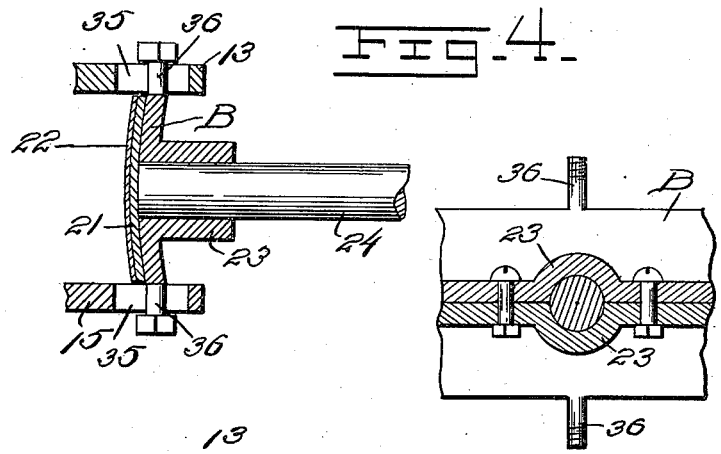
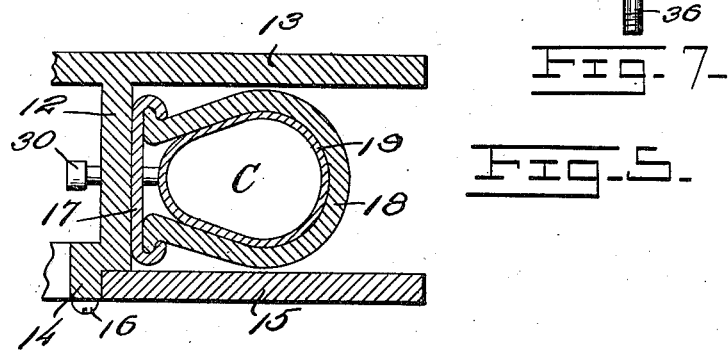
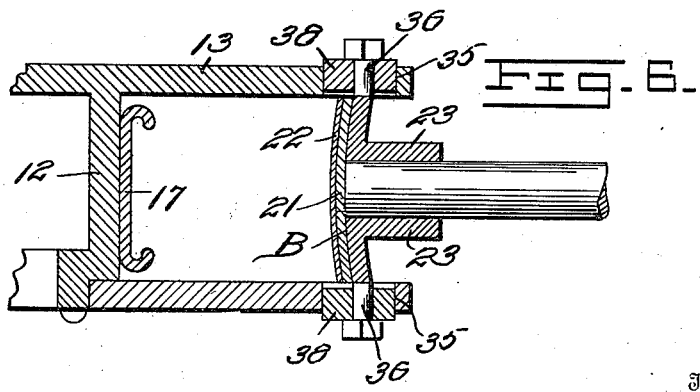
Inventor
J. W. Livingston,
Witnesses
By Woodward & Chandler
Attorneys

UNITED STATES PATENT OFFICE.

JOHN W. LIVINGSTON, OF LIVINGSTON, WISCONSIN, ASSIGNOR OF ONE-HALF TO JOHN NOBLE, OF LIVINGSTON, WISCONSIN.

PNEUMATIC WHEEL.

1,013,554.  Specification of Letters Patent.  Patented Jan. 2, 1912.

Application filed November 7, 1908. Serial No. 461,514.

*To all whom it may concern:*

Be it known that I, JOHN W. LIVINGSTON, a citizen of the United States, residing at Livingston, in the county of Grant and State of Wisconsin, have invented certain new and useful Improvements in Pneumatic Wheels, of which the following is a specification.

This invention relates to wheels for motor vehicles, and has for an object to provide a wheel having a pneumatic cushion protected from abrasive wear and constructed in an economical manner.

A particular object of the device is to provide a particularly effective pneumatic cushion, and means for utilizing a resilient protective casing similar in form to the usual outer casing of automobile tires.

Another object is to provide an effective means for protecting the tire from engagement with abrasive road material.

Another object is to provide such a wheel which may be used without the resilient cushion when desired.

Other objects and advantages will be apparent from the following description and it will be understood that changes in the specific structure shown and described may be made within the scope of the claim without departing from the spirit of the invention.

Figure 1:
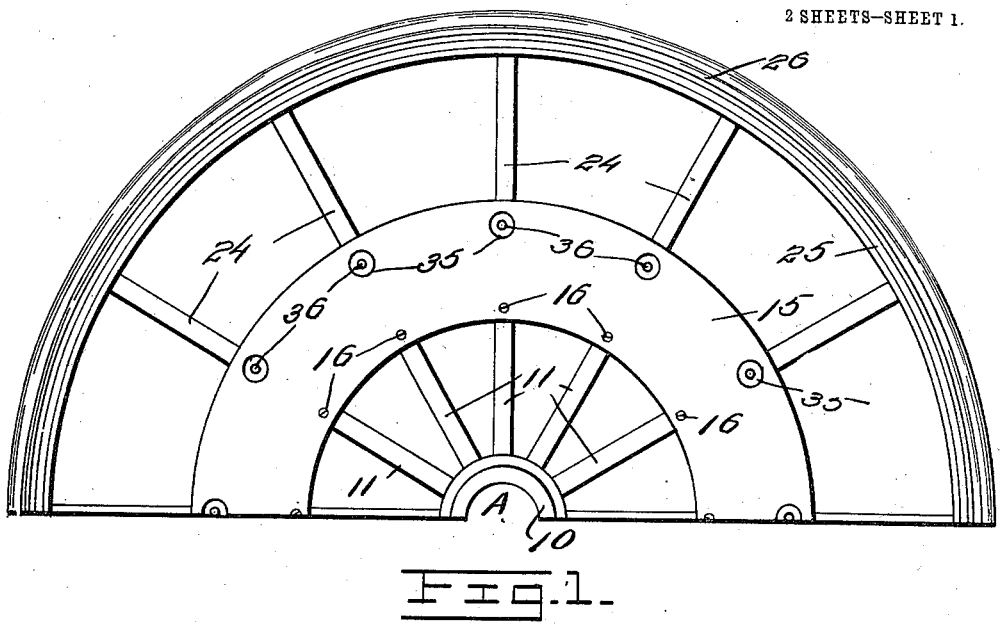
Figure 2:
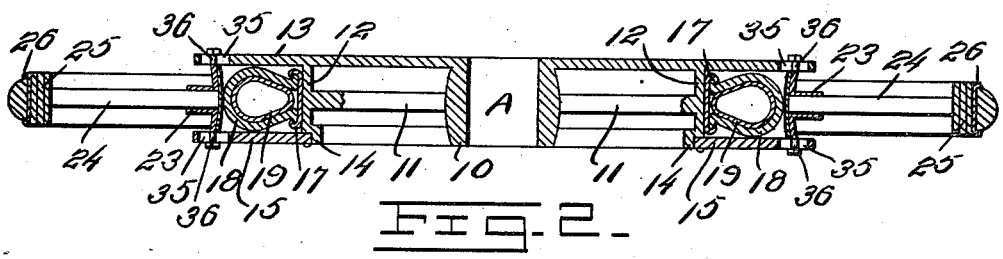
Figure 3:
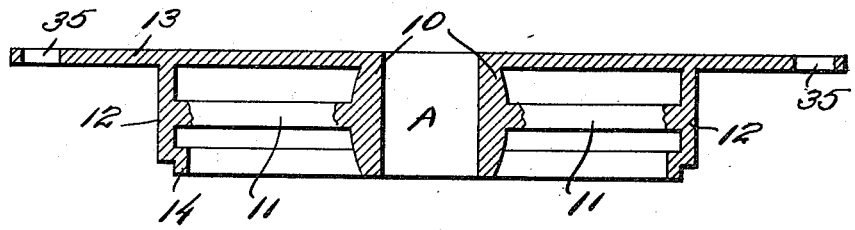

In the drawings forming a portion of this specification, and in which like numerals of reference indicate similar parts in the several views, Figure 1 is a side view of the device, Fig. 2 is a cross sectional view of the device, Fig. 3 is a detail of the central hub, Fig. 4 is a detail cross section of the outer hub, Fig. 5 is a detail view of the cushion and coengaging parts, Fig. 6 is a cross section of the device illustrating its use without a resilient cushion, Fig. 7 is a sectional detail of the outer hub.

Referring to the drawings, there is shown a central hub A, comprising a spindle-engaging portion 10 carrying radial spokes 11 engaged in an inner rim 12. The hub A and spokes 11 may be of any suitable construction. The rim 12 comprises a heavy annular casting having an integral radial flange 13 on its inner side and having a central annular boss 14 on its outer side, as shown. The boss 14 is adapted to engage through the opening in a detachable flange 15 made similar to the flange 13, and adapted to be secured to the casting 12 by means of screws 16 spaced therearound, as shown. Carried upon the peripheral face of the portion 12, there is a clencher rim 17 receiving therein the ribbed edges of a usual form of casing 18, within which there is an inflated tube 19, the casing and tube comprising a cushion C.

Disposed slidably between the flanges 13 and 15, there is a secondary outer hub B comprising a ring member 21 having a smooth inner face covered with leather or other suitable non-abrasive material 22 disposed closely against the outer portion of the cushion C. The inner face of the member is preferably convex in cross section. Carried outwardly of the member 21, there is a two piece metal hub 23 comprising opposite annular sections having registering semicircular recesses in their opposed faces adapted for close engagement around the inner ends of spokes 24 carrying the outer rim 25 which may be of any suitable construction, that shown comprising a plurality of fellies carrying a metallic rim 26 having a cushion tire disposed therein in the usual manner. The rim 12 is provided with a perforation centrally therethrough at one point receiving the valve stem 30 of the tube 19 of the cushion therethrough.

In the flange 13 and collar 15 are formed a circular series of openings 35, in which are engaged a plurality of laterally extending lugs 36 formed upon the hub 23. It will be seen that relative rotation between the hubs A and B is thus prevented in a limited degree.

When it is desired to use the wheel without the tire 18, I provide the members 38 which are adapted to be placed on the lugs 36, and fit snugly in the openings 35, thus producing a rigid wheel.

Dirt or other particles getting into the space between the members 12 and 21, may escape between the edge of the flange 13 and the members 21 or outwardly between the members 21 and the collar 15, this escape being facilitated by the outwardly sloping sides of the inner face of the hub B and the centrifugal influence incident to rotation of the wheel.

What is claimed is:—

A wheel comprising a hub, spokes extending from said hub, a flange on one end of said hub, a rim member formed integrally with said flange and extending at right angles therefrom, the outer end of said spokes being connected to said rim member, a clencher rim secured on the outer face of said rim member, said flange extending beyond said rim member and having a series of openings near its outer periphery a pneumatic tire secured to said clencher rim, a flat annular plate secured to said rim member, said plate having a series of openings near its outer periphery in register with the openings of the extension of said flange, a concavo-convex ring having threaded studs extending from opposite sides thereof through the openings in said flange and plate, said ring having a plurality of sockets, spokes disposed in said sockets, a supplemental rim secured to the outer ends of the last named spokes, and non-abrasive material secured to the convex face of said concavo-convex ring, said ring and non-abrasive material engaging the outer face of said pneumatic tire, said studs playing in said openings whereby said concavo-convex ring will move yieldingly against said pneumatic tire.

In testimony whereof I affix my signature, in presence of two witnesses.

JOHN W. LIVINGSTON.

Witnesses:
  HARRY ALLEN,
  O. S. LAUGHTON.

Copies of this patent may be obtained for five cents each, by addressing the "Commissioner of Patents, Washington, D. C."